United States Patent
Pervan

(10) Patent No.: US 8,850,769 B2
(45) Date of Patent: Oct. 7, 2014

(54) FLOORBOARDS FOR FLOATING FLOORS

(75) Inventor: Darko Pervan, Viken (SE)

(73) Assignee: Valinge Innovation AB, Viken (SE)

( * ) Notice: Subject to any disclaimer, the term of this patent is extended or adjusted under 35 U.S.C. 154(b) by 312 days.

(21) Appl. No.: 10/413,479

(22) Filed: Apr. 15, 2003

(65) Prior Publication Data

US 2003/0233809 A1 Dec. 25, 2003

Related U.S. Application Data

(60) Provisional application No. 60/372,093, filed on Apr. 15, 2002.

(51) Int. Cl.
| | | |
|---|---|---|
| *E04B 9/00* | (2006.01) | |
| *B32B 21/00* | (2006.01) | |
| *E04F 15/02* | (2006.01) | |
| *E04F 15/04* | (2006.01) | |

(52) U.S. Cl.
CPC ... *E04F 15/02033* (2013.01); *E04F 2201/0153* (2013.01); *B32B 21/00* (2013.01); *E04F 15/04* (2013.01)
USPC ........................................... 52/480; 52/582.1

(58) Field of Classification Search
USPC .................. 52/582.1, 480, 796.1, 782.1, 232
See application file for complete search history.

(56) References Cited

U.S. PATENT DOCUMENTS

| | | |
|---|---|---|
| 213,740 A | 4/1879 | Conner |
| 714,987 A | 12/1902 | Wolfe |
| 753,791 A | 3/1904 | Fulghum |
| 1,124,228 A | 1/1915 | Houston |
| 1,194,636 A | 8/1916 | Joy |
| 1,371,856 A | 3/1921 | Cade |
| 1,407,679 A | 2/1922 | Ruthrauff |
| 1,454,250 A | 5/1923 | Parsons |
| 1,468,288 A | 9/1923 | Een |
| 1,477,813 A | 12/1923 | Daniels et al. |
| 1,510,924 A | 10/1924 | Daniels et al. |
| 1,540,128 A | 6/1925 | Houston |
| 1,575,821 A | 3/1926 | Daniels |
| 1,602,256 A | 10/1926 | Sellin |
| 1,602,267 A | 10/1926 | Karwisch |
| 1,615,096 A | 1/1927 | Meyers |
| 1,622,103 A | 3/1927 | Fulton |

(Continued)

FOREIGN PATENT DOCUMENTS

| | | |
|---|---|---|
| AT | 218725 B | 12/1961 |
| AU | 713628 | 1/1998 |

(Continued)

OTHER PUBLICATIONS

Darko Pervan, U.S. Appl. No. 10/730,131 entitled "Floorboards, Flooring Systems and Methods for Manufacturing and Installation Thereof" filed Dec. 9, 2003.

(Continued)

*Primary Examiner* — Basil Katcheves
(74) *Attorney, Agent, or Firm* — Buchanan Ingersoll & Rooney P.C.

(57) ABSTRACT

Floorboards for making a floating floor, which floorboards have a core having at least two layers of material arranged at different distances from the surface layer, which differ with respect to at least one of the parameters of composition of materials and material properties.

22 Claims, 5 Drawing Sheets

(56) References Cited

U.S. PATENT DOCUMENTS

| | | | |
|---|---|---|---|
| 1,622,104 A | 3/1927 | Fulton | |
| 1,637,634 A | 8/1927 | Carter | |
| 1,644,710 A | 10/1927 | Crooks | |
| 1,660,480 A | 2/1928 | Daniels | |
| 1,714,738 A | 5/1929 | Smith | |
| 1,718,702 A | 6/1929 | Pfiester | |
| 1,734,826 A | 11/1929 | Pick | |
| 1,764,331 A | 6/1930 | Moratz | |
| 1,778,069 A | 10/1930 | Fetz | |
| 1,787,027 A | 12/1930 | Wasleff | |
| 1,790,178 A | 1/1931 | Sutherland, Jr. | |
| 1,809,393 A | 6/1931 | Rockwell | |
| 1,823,039 A | 9/1931 | Gruner | |
| 1,859,667 A | 5/1932 | Gruner | |
| 1,898,364 A | 2/1933 | Gynn | |
| 1,906,411 A | 5/1933 | Potvin | |
| 1,925,068 A | 8/1933 | Gray | |
| 1,929,871 A | 10/1933 | Jones | |
| 1,940,377 A | 12/1933 | Storm | |
| 1,953,306 A | 4/1934 | Moratz | |
| 1,986,739 A | 1/1935 | Mitte | |
| 1,988,201 A | 1/1935 | Hall | |
| 1,995,264 A | 3/1935 | Mason | |
| 2,026,511 A | 12/1935 | Storm | |
| 2,044,216 A | 6/1936 | Klages | |
| 2,113,076 A | 4/1938 | Bruce | |
| 2,141,708 A | 12/1938 | Elmendorf | |
| 2,149,026 A | 2/1939 | McBride | |
| 2,266,464 A | 12/1941 | Kraft | |
| 2,276,071 A | 3/1942 | Scull | |
| 2,324,628 A | 7/1943 | Kahr | |
| 2,398,632 A | 4/1946 | Frost et al. | |
| 2,430,200 A | 11/1947 | Wilson | |
| 2,495,862 A | 1/1950 | Osborn | |
| 2,740,167 A | 4/1956 | Rowley | |
| 2,780,253 A | 2/1957 | Joa | |
| 2,851,740 A | 9/1958 | Baker | |
| 2,865,058 A | 12/1958 | Andersson et al. | |
| 2,894,292 A | 7/1959 | Gramelspacher | |
| 2,914,815 A * | 12/1959 | Alexander | 52/592.1 |
| 2,947,040 A | 8/1960 | Schultz | |
| 3,045,294 A | 7/1962 | Livezey, Jr. | |
| 3,100,556 A | 8/1963 | De Ridder | |
| 3,120,083 A | 2/1964 | Dahlberg et al. | |
| 3,125,138 A | 3/1964 | Bolenbach | |
| 3,182,769 A | 5/1965 | De Ridder | |
| 3,200,553 A | 8/1965 | Frashour et al. | |
| 3,203,149 A | 8/1965 | Soddy | |
| 3,234,074 A | 2/1966 | Bryant | |
| 3,247,638 A | 4/1966 | Gay, Jr. | |
| 3,267,630 A | 8/1966 | Omholt | |
| 3,282,010 A | 11/1966 | King, Jr. | |
| 3,301,147 A | 1/1967 | Clayton et al. | |
| 3,310,919 A | 3/1967 | Bue et al. | |
| 3,347,048 A | 10/1967 | Brown et al. | |
| 3,377,931 A | 4/1968 | Hilton | |
| 3,387,422 A | 6/1968 | Wanzer | |
| 3,460,304 A | 8/1969 | Braeuninger et al. | |
| 3,481,810 A | 12/1969 | Waite | |
| 3,508,523 A | 4/1970 | De Meerleer | |
| 3,526,420 A | 9/1970 | Brancalcone | |
| 3,538,665 A | 11/1970 | Gohner | |
| 3,548,559 A * | 12/1970 | Reville, Jr. et al. | 52/782.1 |
| 3,553,919 A | 1/1971 | Omholt | |
| 3,555,762 A | 1/1971 | Costanzo, Jr. | |
| 3,579,941 A | 5/1971 | Tibbals | |
| 3,694,983 A | 10/1972 | Couquet | |
| 3,714,747 A | 2/1973 | Curran | |
| 3,731,445 A | 5/1973 | Hoffmann et al. | |
| 3,759,007 A | 9/1973 | Thiele | |
| 3,768,846 A | 10/1973 | Hensley et al. | |
| 3,786,608 A | 1/1974 | Boettcher | |
| 3,842,562 A | 10/1974 | Daigle | |
| 3,857,749 A | 12/1974 | Yoshida | |
| 3,859,000 A | 1/1975 | Webster | |
| 3,888,061 A | 6/1975 | Kahr | |
| 3,902,293 A | 9/1975 | Witt et al. | |
| 3,908,053 A | 9/1975 | Hettich | |
| 3,936,551 A | 2/1976 | Elmendorf et al. | |
| 3,988,187 A | 10/1976 | Witt et al. | |
| 4,037,377 A | 7/1977 | Howell et al. | |
| 4,084,996 A | 4/1978 | Wheeler | |
| 4,090,338 A | 5/1978 | Bourgade | |
| 4,099,358 A | 7/1978 | Compaan | |
| 4,100,710 A | 7/1978 | Kowallik | |
| 4,169,688 A | 10/1979 | Toshio | |
| 4,227,430 A | 10/1980 | Jansson et al. | |
| 4,242,390 A | 12/1980 | Nemeth | |
| 4,299,070 A | 11/1981 | Oltmanns et al. | |
| 4,304,083 A | 12/1981 | Anderson | |
| 4,426,820 A | 1/1984 | Terbrack et al. | |
| 4,471,012 A | 9/1984 | Maxwell | |
| 4,489,115 A | 12/1984 | Layman et al. | |
| 4,501,102 A | 2/1985 | Knowles | |
| 4,561,233 A | 12/1985 | Harter et al. | |
| 4,567,706 A | 2/1986 | Wendt | |
| 4,612,074 A | 9/1986 | Smith et al. | |
| 4,612,745 A | 9/1986 | Hovde | |
| 4,641,469 A | 2/1987 | Wood | |
| 4,643,237 A | 2/1987 | Rosa | |
| 4,646,494 A * | 3/1987 | Saarinen et al. | 52/232 |
| 4,648,165 A | 3/1987 | Whitehorne | |
| 4,653,242 A | 3/1987 | Ezard | |
| 4,694,627 A | 9/1987 | Omholt | |
| 4,703,597 A | 11/1987 | Eggemar | |
| 4,715,162 A | 12/1987 | Brightwell | |
| 4,716,700 A | 1/1988 | Hagemeyer | |
| 4,738,071 A | 4/1988 | Ezard | |
| 4,769,963 A | 9/1988 | Meyerson | |
| 4,819,932 A | 4/1989 | Trotter, Jr. | |
| 4,822,440 A | 4/1989 | Hsu et al. | |
| 4,831,806 A | 5/1989 | Niese et al. | |
| 4,845,907 A | 7/1989 | Meek | |
| 4,905,442 A | 3/1990 | Daniels | |
| 5,029,425 A | 7/1991 | Bogataj | |
| 5,113,632 A | 5/1992 | Hanson | |
| 5,117,603 A | 6/1992 | Weintraub | |
| 5,148,850 A | 9/1992 | Urbanick | |
| 5,165,816 A | 11/1992 | Parasin | |
| 5,179,812 A | 1/1993 | Hill | |
| 5,216,861 A | 6/1993 | Meyerson | |
| 5,253,464 A | 10/1993 | Nilsen | |
| 5,271,564 A | 12/1993 | Smith | |
| 5,286,545 A | 2/1994 | Simmons, Jr. | |
| 5,295,341 A | 3/1994 | Kajiwara | |
| 5,349,796 A | 9/1994 | Meyerson | |
| 5,390,457 A | 2/1995 | Sjolander | |
| 5,433,806 A | 7/1995 | Pasquali et al. | |
| 5,474,831 A | 12/1995 | Nystrom | |
| 5,497,589 A | 3/1996 | Porter | |
| 5,502,939 A | 4/1996 | Zadok et al. | |
| 5,540,025 A * | 7/1996 | Takehara et al. | 52/403.1 |
| 5,560,569 A | 10/1996 | Schmidt | |
| 5,567,497 A | 10/1996 | Zegler et al. | |
| 5,570,554 A | 11/1996 | Searer | |
| 5,597,024 A | 1/1997 | Bolyard et al. | |
| 5,613,894 A | 3/1997 | Delle VeDove | |
| 5,618,602 A | 4/1997 | Nelson | |
| 5,630,304 A | 5/1997 | Austin | |
| 5,653,099 A | 8/1997 | MacKenzie | |
| 5,671,575 A | 9/1997 | Wu | |
| 5,695,875 A | 12/1997 | Larsson et al. | |
| 5,706,621 A | 1/1998 | Pervan | |
| 5,755,068 A | 5/1998 | Ormiston | |
| 5,768,850 A | 6/1998 | Chen | |
| 5,797,237 A | 8/1998 | Finkell, Jr. | |
| 5,823,240 A | 10/1998 | Bolyard et al. | |
| 5,827,592 A | 10/1998 | Van Gulik et al. | |
| 5,860,267 A | 1/1999 | Pervan | |
| 5,899,038 A * | 5/1999 | Stroppiana | 52/403.1 |
| 5,900,099 A | 5/1999 | Sweet et al. | |
| 5,925,211 A | 7/1999 | Rakauskas | |
| 5,935,668 A | 8/1999 | Smith | |
| 5,943,239 A | 8/1999 | Shamblin et al. | |

(56) References Cited

U.S. PATENT DOCUMENTS

| | | | |
|---|---|---|---|
| 5,968,625 A | 10/1999 | Hudson | |
| 5,987,839 A | 11/1999 | Hamar et al. | |
| 6,006,486 A * | 12/1999 | Moriau et al. | 52/589.1 |
| 6,023,907 A | 2/2000 | Pervan | |
| 6,029,416 A | 2/2000 | Andersson | |
| 6,094,882 A | 8/2000 | Pervan | |
| 6,101,778 A | 8/2000 | Martensson | |
| 6,119,423 A | 9/2000 | Costantino | |
| 6,134,854 A | 10/2000 | Stanchfield | |
| 6,148,884 A | 11/2000 | Bolyard et al. | |
| 6,173,548 B1 | 1/2001 | Hamar et al. | |
| 6,182,410 B1 | 2/2001 | Pervan | |
| 6,182,413 B1 | 2/2001 | Magnusson | |
| 6,203,653 B1 | 3/2001 | Seidner | |
| 6,205,639 B1 | 3/2001 | Pervan | |
| 6,209,278 B1 | 4/2001 | Tychsen | |
| 6,212,838 B1 * | 4/2001 | Eda | 52/403.1 |
| 6,216,403 B1 | 4/2001 | Belbeoc'h | |
| 6,216,409 B1 | 4/2001 | Roy et al. | |
| 6,247,285 B1 * | 6/2001 | Moebus | 52/589.1 |
| 6,314,701 B1 | 11/2001 | Meyerson | |
| 6,324,803 B1 | 12/2001 | Pervan | |
| 6,332,733 B1 * | 12/2001 | Hamberger et al. | 403/329 |
| 6,339,908 B1 | 1/2002 | Chuang | |
| 6,345,481 B1 | 2/2002 | Nelson | |
| 6,363,677 B1 | 4/2002 | Chen et al. | |
| 6,385,936 B1 | 5/2002 | Schneider | |
| 6,397,547 B1 | 6/2002 | Martensson | |
| 6,421,970 B1 | 7/2002 | Martensson et al. | |
| 6,438,919 B1 | 8/2002 | Knauseder | |
| 6,446,405 B1 | 9/2002 | Pervan | |
| 6,490,836 B1 | 12/2002 | Moriau et al. | |
| 6,497,079 B1 | 12/2002 | Pletzer et al. | |
| 6,505,452 B1 * | 1/2003 | Hannig et al. | 52/582.1 |
| 6,510,665 B2 | 1/2003 | Pervan | |
| 6,516,579 B1 | 2/2003 | Pervan | |
| 6,532,709 B2 | 3/2003 | Pervan | |
| 6,536,178 B1 | 3/2003 | Palsson et al. | |
| 6,584,747 B2 | 7/2003 | Kettler et al. | |
| 6,591,568 B1 | 7/2003 | Pålsson | |
| 6,601,359 B2 | 8/2003 | Olofsson | |
| 6,606,834 B2 * | 8/2003 | Martensson et al. | 52/578 |
| 6,647,689 B2 | 11/2003 | Pletzer et al. | |
| 6,647,690 B1 | 11/2003 | Martensson | |
| 6,670,019 B2 | 12/2003 | Andersson | |
| 6,672,030 B2 | 1/2004 | Schulte | |
| 6,684,592 B2 | 2/2004 | Martin | |
| 6,722,809 B2 * | 4/2004 | Hamberger et al. | 403/329 |
| 6,763,643 B1 | 7/2004 | Martensson | |
| 6,769,219 B2 | 8/2004 | Schwitte et al. | |
| 6,786,019 B2 | 9/2004 | Thiers | |
| 6,804,926 B1 | 10/2004 | Eisermann | |
| 6,854,235 B2 | 2/2005 | Martensson | |
| 6,874,292 B2 | 4/2005 | Moriau et al. | |
| 6,933,043 B1 * | 8/2005 | Son et al. | 428/215 |
| 7,003,925 B2 | 2/2006 | Pervan | |
| 7,022,189 B2 | 4/2006 | Delle VeDove | |
| 7,040,068 B2 | 5/2006 | Moriau et al. | |
| 7,051,486 B2 | 5/2006 | Pervan | |
| 7,121,059 B2 | 10/2006 | Pervan | |
| 2001/0029720 A1 | 10/2001 | Pervan | |
| 2001/0034992 A1 | 11/2001 | Pletzer et al. | |
| 2002/0007608 A1 | 1/2002 | Pervan | |
| 2002/0014047 A1 | 2/2002 | Thiers | |
| 2002/0020127 A1 | 2/2002 | Thiers et al. | |
| 2002/0031646 A1 | 3/2002 | Chen et al. | |
| 2002/0046528 A1 | 4/2002 | Pervan et al. | |
| 2002/0059765 A1 | 5/2002 | Nogueira et al. | |
| 2002/0069611 A1 | 6/2002 | Leopolder | |
| 2002/0083673 A1 | 7/2002 | Kettler et al. | |
| 2002/0100231 A1 | 8/2002 | Miller et al. | |
| 2002/0112433 A1 | 8/2002 | Pervan | |
| 2002/0178673 A1 | 12/2002 | Pervan | |
| 2002/0178674 A1 | 12/2002 | Pervan | |
| 2002/0178682 A1 | 12/2002 | Pervan | |
| 2003/0009972 A1 | 1/2003 | Pervan et al. | |
| 2003/0024199 A1 | 2/2003 | Pervan et al. | |
| 2003/0033777 A1 | 2/2003 | Thiers et al. | |
| 2003/0033784 A1 | 2/2003 | Pervan | |
| 2003/0041545 A1 | 3/2003 | Stanchfield | |
| 2003/0084636 A1 | 5/2003 | Pervan | |
| 2003/0101674 A1 | 6/2003 | Pervan | |
| 2003/0101681 A1 | 6/2003 | Tychsen | |
| 2003/0115812 A1 | 6/2003 | Pervan | |
| 2003/0115821 A1 | 6/2003 | Pervan | |
| 2004/0035078 A1 | 2/2004 | Pervan | |
| 2004/0139678 A1 | 7/2004 | Pervan | |
| 2004/0177584 A1 | 9/2004 | Pervan | |
| 2004/0206036 A1 | 10/2004 | Pervan | |
| 2004/0241374 A1 | 12/2004 | Thiers et al. | |
| 2004/0255541 A1 | 12/2004 | Thiers et al. | |
| 2005/0034404 A1 | 2/2005 | Pervan | |
| 2005/0034405 A1 | 2/2005 | Pervan | |
| 2005/0102937 A1 | 5/2005 | Pervan | |
| 2005/0138881 A1 | 6/2005 | Pervan | |
| 2005/0160694 A1 | 7/2005 | Pervan | |
| 2005/0161468 A1 | 7/2005 | Wagner | |
| 2005/0166514 A1 | 8/2005 | Pervan | |
| 2005/0166516 A1 | 8/2005 | Pervan | |
| 2005/0193677 A1 | 9/2005 | Vogel | |
| 2005/0208255 A1 | 9/2005 | Pervan | |
| 2005/0210810 A1 | 9/2005 | Pervan | |
| 2005/0235593 A1 | 10/2005 | Hecht | |
| 2006/0048474 A1 | 3/2006 | Pervan | |
| 2006/0070333 A1 | 4/2006 | Pervan | |
| 2006/0073320 A1 | 4/2006 | Pervan | |
| 2006/0075713 A1 | 4/2006 | Pervan | |
| 2006/0101769 A1 | 5/2006 | Pervan | |
| 2006/0117696 A1 | 6/2006 | Pervan | |
| 2006/0179773 A1 | 8/2006 | Pervan | |
| 2006/0196139 A1 | 9/2006 | Pervan | |
| 2006/0236642 A1 | 10/2006 | Pervan | |
| 2006/0260254 A1 | 11/2006 | Pervan | |
| 2006/0283127 A1 | 12/2006 | Pervan | |
| 2007/0119110 A1 | 5/2007 | Pervan | |
| 2007/0159814 A1 | 7/2007 | Jacobsson | |
| 2008/0008871 A1 | 1/2008 | Pervan | |
| 2008/0028707 A1 | 2/2008 | Pervan | |

FOREIGN PATENT DOCUMENTS

| | | | |
|---|---|---|---|
| AU | 200020703 A1 | 6/2000 | |
| BE | 417526 | 9/1936 | |
| BE | 0557844 | 6/1957 | |
| BE | 1010339 A3 | 6/1998 | |
| BE | 1010487 A6 | 10/1998 | |
| CA | 0991373 | 6/1976 | |
| CA | 2226286 | 12/1997 | |
| CA | 2252791 | 5/1999 | |
| CA | 2289309 | 7/2000 | |
| CA | 2 363 184 | 7/2001 | |
| CH | 200949 | 1/1939 | |
| CH | 211877 | 1/1941 | |
| CH | 690242 A5 | 6/2000 | |
| DE | 1 212 275 | 3/1966 | |
| DE | 7102476 | 1/1971 | |
| DE | 1 534 278 | 11/1971 | |
| DE | 2 159 042 | 11/1971 | |
| DE | 2 205 232 | 8/1973 | |
| DE | 7402354 | 1/1974 | |
| DE | 2 238 660 | 2/1974 | |
| DE | 2 252 643 | 5/1974 | |
| DE | 2 502 992 | 7/1976 | |
| DE | 2 616 077 | 10/1977 | |
| DE | 2 917 025 | 11/1980 | |
| DE | 30 41781 A1 | 6/1982 | |
| DE | 32 14 207 A1 | 11/1982 | |
| DE | 32 46 376 C2 | 6/1984 | |
| DE | 33 43 601 A1 | 6/1985 | |
| DE | 35 38 538 A1 | 10/1985 | |
| DE | 86 04 004 | 6/1986 | |
| DE | 35 12 204 A1 | 10/1986 | |
| DE | 35 44 845 A1 | 6/1987 | |
| DE | 36 31 390 A1 | 12/1987 | |

(56) References Cited

FOREIGN PATENT DOCUMENTS

| | | |
|---|---|---|
| DE | 40 02 547 A1 | 8/1991 |
| DE | 41 30 115 A1 | 9/1991 |
| DE | 41 34 452 A1 | 4/1993 |
| DE | 42 15 273 A1 | 11/1993 |
| DE | 42 42 530 A1 | 6/1994 |
| DE | 43 13 037 C1 | 8/1994 |
| DE | 93 17 191 U1 | 3/1995 |
| DE | 296 10 462 | 10/1996 |
| DE | 196 01 322 A1 | 5/1997 |
| DE | 296 18 318 U1 | 5/1997 |
| DE | 297 10 175 U1 | 9/1997 |
| DE | 196 51 149 A1 | 6/1998 |
| DE | 197 09 641 A1 | 9/1998 |
| DE | 197 18 319 A1 | 11/1998 |
| DE | 197 18 812 A1 | 11/1998 |
| DE | 299 22 649 U1 | 4/2000 |
| DE | 200 01 225 U1 | 8/2000 |
| DE | 200 02 744 U1 | 9/2000 |
| DE | 199 25 248 A1 | 12/2000 |
| DE | 200 13 380 | 12/2000 |
| DE | 200 17 461 U1 | 3/2001 |
| DE | 200 18 284 U1 | 3/2001 |
| DE | 100 01 248 | 7/2001 |
| DE | 100 32 204 C1 | 7/2001 |
| DE | 201 08 358 | 10/2001 |
| DE | 201 08 358 U1 | 10/2001 |
| DE | 100 44 016 A1 | 3/2002 |
| DE | 202 05 774 U1 | 8/2002 |
| DE | 203 07 580 U1 | 7/2003 |
| DE | 20 2004 001 038 U1 | 5/2004 |
| DE | 20 2005 006 300 U1 | 8/2005 |
| DE | 10 2004 054 368 A1 | 5/2006 |
| EP | 0 248 127 A1 | 12/1987 |
| EP | 0 487 925 A1 | 6/1992 |
| EP | 0 623 724 A1 | 11/1994 |
| EP | 0 652 340 A1 | 5/1995 |
| EP | 0 665 347 | 8/1995 |
| EP | 0 690 185 A1 | 1/1996 |
| EP | 0 698 162 B1 | 2/1996 |
| EP | 0 843 763 B1 | 5/1998 |
| EP | 0 849 416 A2 | 6/1998 |
| EP | 0 855 482 B1 | 7/1998 |
| EP | 0 877 130 B1 | 11/1998 |
| EP | 0 958 441 | 11/1998 |
| EP | 0 661 135 B1 | 12/1998 |
| EP | 0 903 451 A2 | 3/1999 |
| EP | 0 969 163 A2 | 1/2000 |
| EP | 0 969 163 A3 | 1/2000 |
| EP | 0 969 164 A2 | 1/2000 |
| EP | 0 969 164 A3 | 1/2000 |
| EP | 0 974 713 A1 | 1/2000 |
| EP | 0 976 889 | 2/2000 |
| EP | 1 048 423 A2 | 11/2000 |
| EP | 1 251 219 A1 | 7/2001 |
| EP | 1 120 515 A1 | 8/2001 |
| EP | 1 146 182 A2 | 10/2001 |
| EP | 1 165 906 | 1/2002 |
| EP | 1 223 265 | 7/2002 |
| EP | 1 262 609 | 12/2002 |
| EP | 1 317 983 A2 | 6/2003 |
| EP | 1 338 344 A2 | 8/2003 |
| FI | 843060 | 8/1984 |
| FR | 1 293 043 | 4/1962 |
| FR | 2 568 295 | 1/1986 |
| FR | 2 630 149 | 10/1989 |
| FR | 2 637 932 A1 | 4/1990 |
| FR | 2 675 174 | 10/1992 |
| FR | 2 691 491 | 11/1993 |
| FR | 2 697 275 | 4/1994 |
| FR | 2 712 329 A1 | 5/1995 |
| FR | 2 781 513 A1 | 1/2000 |
| FR | 2 785 633 A1 | 5/2000 |
| FR | 2 810 060 A1 | 12/2001 |
| GB | 240629 | 10/1925 |
| GB | 424057 | 2/1935 |
| GB | 585205 | 1/1947 |
| GB | 599793 | 3/1948 |
| GB | 636423 | 4/1950 |
| GB | 812671 | 4/1959 |
| GB | 1127915 | 10/1968 |
| GB | 1171337 | 11/1969 |
| GB | 1237744 | 6/1971 |
| GB | 1275511 | 5/1972 |
| GB | 1 394 621 | 5/1975 |
| GB | 1430423 | 3/1976 |
| GB | 2117813 A | 10/1983 |
| GB | 2126106 A | 3/1984 |
| GB | 2243381 A | 10/1991 |
| GB | 2256023 A | 11/1992 |
| JP | 54-65528 | 5/1979 |
| JP | 57-119056 | 7/1982 |
| JP | 57-185110 | 11/1982 |
| JP | 59-186336 | 11/1984 |
| JP | 3-169967 | 7/1991 |
| JP | 4-106264 | 4/1992 |
| JP | 4-191001 | 7/1992 |
| JP | 50-21027 U | 3/1993 |
| JP | 5-148984 | 6/1993 |
| JP | 6-56310 | 5/1994 |
| JP | 6-146553 | 5/1994 |
| JP | 6-320510 | 11/1994 |
| JP | 7-076923 | 3/1995 |
| JP | 7-180333 | 7/1995 |
| JP | 7-300979 | 11/1995 |
| JP | 7-310426 | 11/1995 |
| JP | 8-109734 | 4/1996 |
| JP | 9-38906 | 2/1997 |
| JP | 9-038906 A | 2/1997 |
| JP | 9-88315 | 3/1997 |
| JP | 10-299230 A | 11/1998 |
| JP | 2000-179137 | 6/2000 |
| JP | P2000 226932 | 8/2000 |
| JP | 2001-173213 | 6/2001 |
| JP | 2001 179710 | 7/2001 |
| JP | 2001 254503 | 9/2001 |
| JP | 2001 260107 | 9/2001 |
| JP | 2001-329681 A | 11/2001 |
| JP | P2001 329681 | 11/2001 |
| JP | 2003-027731 A | 1/2003 |
| NL | 7601773 | 8/1976 |
| NO | 157871 | 7/1984 |
| NO | 305614 | 5/1995 |
| PL | 24931 U | 11/1974 |
| SE | 372 051 | 5/1973 |
| SE | 450 141 | 6/1984 |
| SE | 501 014 C2 | 10/1994 |
| SE | 502 994 | 3/1996 |
| SE | 506 254 C2 | 11/1997 |
| SE | 509 059 | 6/1998 |
| SE | 509 060 | 6/1998 |
| SE | 512 290 | 12/1999 |
| SE | 512 313 | 12/1999 |
| SE | 0000200-6 | 7/2001 |
| SU | 363795 | 11/1973 |
| SU | 1680359 A1 | 9/1991 |
| WO | WO 84/02155 | 6/1984 |
| WO | WO 87/03839 A1 | 7/1987 |
| WO | WO 92/17657 | 10/1992 |
| WO | WO 93/13280 | 7/1993 |
| WO | WO 94/01628 | 1/1994 |
| WO | WO 94/26999 | 11/1994 |
| WO | WO 96/27719 | 9/1996 |
| WO | WO 96/27721 | 9/1996 |
| WO | WO 96/30177 A1 | 10/1996 |
| WO | 97/19232 | 5/1997 |
| WO | WO 97/47834 | 12/1997 |
| WO | WO 98/22677 A1 | 5/1998 |
| WO | WO 98/24994 | 6/1998 |
| WO | WO 98/24995 | 6/1998 |
| WO | WO 98/38401 A1 | 9/1998 |
| WO | WO 99/40273 A1 | 8/1999 |
| WO | WO 99/66151 | 12/1999 |
| WO | WO 99/66152 | 12/1999 |
| WO | WO 00/06854 | 1/2000 |

(56) References Cited

FOREIGN PATENT DOCUMENTS

| WO | WO 00/20705 A1 | 4/2000 |
|---|---|---|
| WO | WO 00/20706 A1 | 4/2000 |
| WO | WO 00/66856 A1 | 11/2000 |
| WO | WO 01/02669 A1 | 1/2001 |
| WO | 01/07729 | 2/2001 |
| WO | 01/51733 A1 | 7/2001 |
| WO | 01/66877 A1 | 9/2001 |
| WO | WO 01/66876 A1 | 9/2001 |
| WO | WO 01/75247 A1 | 10/2001 |
| WO | WO 01/77461 A1 | 10/2001 |
| WO | 01/96688 | 12/2001 |
| WO | 01/98603 | 12/2001 |
| WO | 01/98604 A1 | 12/2001 |
| WO | 02/055809 A1 | 7/2002 |
| WO | 02/055810 A1 | 7/2002 |
| WO | 02/060691 | 8/2002 |
| WO | WO 03/016654 A1 | 2/2003 |
| WO | 03/070384 A1 | 8/2003 |
| WO | 03/078761 A1 | 9/2003 |
| WO | WO 03/074814 A1 | 9/2003 |
| WO | WO 03/083234 A1 | 10/2003 |
| WO | 03/099461 A1 | 12/2003 |
| WO | WO 2004/083557 A1 | 9/2004 |
| WO | 2005/077625 A1 | 8/2005 |
| WO | 2005/110677 A1 | 11/2005 |
| WO | 2006/008578 A1 | 1/2006 |
| WO | 2006/111437 A1 | 10/2006 |
| WO | 2006/113757 A2 | 10/2006 |

OTHER PUBLICATIONS

Darko Pervan, U.S. Appl. No. 10/768,677 entitled "Mechanical Locking System for Floorboards" filed Feb. 2, 2004.
Darko Pervan, U.S. Appl. No. 10/708,314 entitled "Floorboard and Method of Manufacturing Thereof" filed Feb. 24, 2004.
Webster's Dictionary, Random House: New York (1987), p. 862.
Knight's American Mechanical Dictionary, Hurd and Houghton: New York (1876), p. 2051.
Opposition EP 0.698,162 B1—Facts—Grounds—Arguments, dated Apr. 1, 1999, pp. 1-56.
Opposition II EP 0.698,162 B1—Facts—Grounds—Arguments, dated Apr. 30, 1999, (17 pages)—with translation (11 pages).
Opposition I: Unilin Decor N.V./Välinge Aluminum AB, communication dated Jun. 8, 1999 to European Patent Office, pp. 1-2.
Opposition I: Unilin Decor N.V./Välinge Aluminum AB, communication dated Jun. 16, 1999 to European Patent Office, pp. 1-2.
FI Office Action dated Mar. 19, 1998.
NO Office Action dated Dec. 22, 1997.
NO Office Action dated Sep. 21, 1998.
Opposition EP 0.877.130 B1—Facts—Arguments, dated Jun. 28, 2000, pp. 1-13.
RU Application Examiner Letter dated Sep. 26, 1997.
NZ Application Examiner Letter dated Oct. 21, 1999.
European prosecution file history to grant, European Patent No. 94915725.9-2303/0698162, grant date Sep. 16, 1998.
European prosecution file history to grant, European Patent No. 98106535.2-2303/0855482, grant date Dec. 1, 1999.
European prosecution file history to grant, European Patent No. 98201555.4-2303/0877130, grant date Jan. 26, 2000.
Communication of Notices of Intervention by E.F.P. Floor Products dated Mar. 17, 2000 in European Patent Application 0698162, pp. 1-11 with annex pp. 1-21.
Response to the E.F.P. Floor Products intervention dated Jun. 28, 2000, pp. 1-5.
Letters from the Opponent dated Jul. 26, 2001 and Jul. 30, 2001 including Annexes 1 to 3.
Communication from European Patent Office dated Sep. 20, 2001 in European Patent No. 0698162, pp. 1-2 with Facts and Submissions Annex pp. 1-18, Minutes Annex pp. 1-11, and Annex I to VI.
Communication from Swedish Patent Office dated Sep. 21, 2001 in Swedish Patent No. 9801986-2, pp. 1-3 in Swedish with forwarding letter dated Sep. 24, 2001 in English.
Välinge, Fibo-Trespo Brochure, Distributed at the Domotex Fair in Hannover, Germany, Jan. 1996.
Träindustrins Handbook "Snickeriarbete", 2nd Edition, Malmö 1952, pp. 826, 827, 854, and 855, published by Teknografiska Aktiebolaget, Sweden.
"Träbearbetning", Anders Grönlund, 1986, ISBN 91-970513-2-2, pp. 357-360, published by Institute for Trateknisk Forskning, Stockholm, Sweden.
Drawing Figure 25/6107 from Buetec Gmbh dated Dec. 16, 1985.
Pamphlet from Serexhe for Compact-Praxis, entitled "Selbst Teppichböden, PVC und Parkett verlegen", Published by Compact Verlag, München, Germany 1985, pp. 84-87.
Pamphlet from Junckers Industrser A/S entitled"Bøjlesystemet til Junckers boliggulve" Oct. 1994, Published by Junckers Industrser A/S, Denmark.
Pamphlet from Junckers Industrser A/S entitled "The Clip System for Junckers Sports Floors"Annex 7, 1994, Published by Junckers Industrser A/S, Denmark.
Pamphlet from Junckers Industrser A/S entitled "The Clip System for Junckers Domestic Floors", Annex 8, 1994, Published by Junckers Industrser A/S, Denmark.
Fibo-Trespo Alloc System Brochure entitled "Opplæring OG Autorisasjon", pp. 1-29, Fibo-Trespo.
"Revolution bei der Laminatboden-Verl", boden wand decke, vol. No. 11 of 14, Jan. 10, 1997, p. 166.
Kährs Focus Extra dated Jan. 2001, pp. 1-9.
Brochure for CLIC Laminate Flooring, Art.-Nr. 110 11 640.
Brochure for Laminat-Boden "Clever-Click", Parador® Wohnsysteme.
Brochure for Pergo®, CLIC Laminate Flooring, and Prime Laminate Flooring from Bauhaus, The Home Store, Malmö, Sweden.
Darko Pervan, U.S. Appl. No. 09/714,514 entitled "*Locking System and Flooring Board*" filed Nov. 17, 2000.
Darko Pervan et al. U.S. Appl. No. 10/235,940 entitled "*Flooring and Method for Laying and Manufacturing the Same*" filed Sep. 6, 2002.
Darko Pervan, U.S. Appl. No. 10/413,478 entitled "Mechanical Locking System for Floating Floor" filed Apr. 15, 2003.
Darko Pervan, U.S. Appl. No. 10/413,566 entitled "Floorboards with Decorative Grooves" filed Apr. 15, 2003.
Tony Pervan, U.S. Appl. No. 10/430,273 entitled "System for Joining Building Panels" filed May 7, 2003.
Darko Pervan, U.S. Appl. No. 10/908,658 entitled "Mechanical Locking System for Floor Panels" filed May 20, 2005.
Darko Pervan et al., U.S. Appl. No. 10/508,198 entitled "Floorboards With Decorative Grooves" filed Sep. 20, 2004.
Pervan, U.S. Appl. No. 10/509,885 entitled "Mechanical Locking System for Floorboards" filed Oct. 4, 2004.
Darko Pervan, U.S. Appl. No. 10/958,233 entitled "Locking System for Floorboards" filed Oct. 6, 2004.
Darko Pervan, U.S. Appl. No. 10/510,580 entitled "Floorboards for Floorings" filed Oct. 8, 2004.
Darko Pervan, U.S. Appl. No. 10/970,282 entitled "Mechanical Locking System for Floor Panels" filed Oct. 22, 2004.
Darko Pervan, U.S. Appl. No. 10/975,923 entitled "Flooring Systems and Methods for Installation" filed Oct. 29, 2004.
Darko Pervan, U.S. Appl. No. 11/000,912 entitled "Floorboard, System and Method for Forming a Flooring, and Flooring Formed Thereof" filed Dec. 2, 2004.
Darko Pervan, U.S. Appl. No. 11/008,213 entitled "Metal Strip for Interlocking Floorboard and a Floorbaord Using Same" filed Dec. 10, 2004.
Darko Pervan, U.S. Appl. No. 11/034,059 entitled "Floor Covering and Locking System" filed Jan. 13, 2005.
Darko Pervan, U.S. Appl. No. 11/034,060 entitled "Floor Covering and Locking System" filed Jan. 13, 2005.
Darko Pervan, U.S. Appl. No. 10/906,109 entitled "Locking System and Flooring Board" filed Feb. 3, 2005.
Darko Pervan, U.S. Appl. No. 10/906,356 entitled "Building Panel With Compressed Edges and Method of Making Same" filed Feb. 15, 2005.
Darko Pervan, U.S. Appl. No. 11/092,748 entitled "Mechanical Locking System for Panels and Method of Installing Same" filed Mar. 30, 2005.

(56) References Cited

OTHER PUBLICATIONS

Darko Pervan et al, U.S. Appl. No. 11/161,520 entitled "Method of Making a Floorboard and Mehtod of Making a Floor With the Floorboard" filed Aug. 6, 2005.

Darko Pervan et al, U.S. Appl. No. 11/163,085 entitled "Appliance and Method for Surface Treatment of a Board Shaped Material and Floorboard" filed Oct. 4, 2005.

Jacobsson, Jan, et al., U.S. Appl. No. 11/521,439, entitled "Device and Method for Compressing an Edge of a Building Panel and a Building Panel With Compressed Edges", filed on Sep. 15, 2006.

Pervan, Darko, U.S. Appl. No. 11/627,971, entitled "Locking System for Floorboards", filed on Jan. 28, 2007.

Pervan, Darko, et al., U.S. Appl. No. 11/635,674, entitled "Laminate Floor Panels", filed Dec. 8, 2006.

Pervan, Darko, et al., U.S. Appl. No. 11/635,633, entitled "Laminate Floor Panels" filed Dec. 8, 2006.

Hakansson, Niclas, U.S. Appl. No. 11/643,881, entitled "V-Groove", filed Dec. 22, 2006.

Bergelin, Marcus, et al., U.S. Appl. No. 11/649,837, entitled "Resilient Groove", filed Jan. 5, 2007.

Pervan, Darko, et al., U.S. Appl. No. 11/575,600, entitled "Mechanical Locking of Floor Panels with a Flexible Tongue", filed Mar. 20, 2007.

Pervan, Darko, U.S. Appl. No. 11/806,478, entitled "Wear Resistant Surface", filed May 31, 2007.

Pervan, Darko, et al., U.S. Appl. No. 11/770,771, entitled "Locking System Comprising a Combination Lock for Panels", filed Jun. 29, 2007.

Pervan, Darko, et al., U.S. Appl. No. 11/775,885, entitled "Mechanical Locking of Floor Panels with a Flexible Bristle Tongue", filed Jul. 11, 2007.

English language translation of DE 201 080 358.

Correspondence from Bütec cited during opposition procedure at EPO in DE Patent No. 3343601, including announcement of Oct. 1984 re "Das Festprogram von Bütec: Mehrzweckbühnen, tanzplatten, Schonbeläge, Tanzbeläge, Bestuhlung"; letter of Nov. 7, 2001 to Perstorp Support AB with attached brochure published Oct. 1984 and installation instructions published Nov. 1984; and letter of Nov. 19, 2001 to Perstorp Support AB.

Bergelin, Marcus, et al., U.S. Appl. No. 13/738,401 entitled "A Lamella Core and a Method of Producing It," filed in the U.S. Patent and Trademark Office on Jan. 10, 2013.

Pervan, Darko, U.S. Appl. No. 13/758,400 entitled "Floorboards for Flooring," filed in the U.S. Patent and Trademark Office on Feb. 4, 2013.

Pervan, Darko, et al., U.S. Appl. No. 13/870,224, entitled "Building Panels of Solid Wood," filed in the U.S. Patent and Trademark Office on Apr. 25, 2013.

Pervan, Darko, U.S. Appl. No. 13/932,406, entitled "Panel Forming," filed in the U.S. Patent and Trademark Office on Jul. 1, 2013.

Pervan, Darko, U.S. Appl. No. 14/248,018 entitled "Floorboards for Floorings," filed in the U.S. Patent and Trademark Office on Apr. 8, 2014.

* cited by examiner

FLOORBOARDS FOR FLOATING FLOORS

CROSS-REFERENCE TO RELATED APPLICATIONS

The present application claims the benefit of U.S. Provisional Application No. 60/372,093, filed in the U.S. on Apr. 15, 2002, the entire contents of which are herein incorporated by reference.

BACKGROUND OF THE INVENTION

1. Field of the Invention

The invention relates to floorboards provided with core materials and floor elements of core materials intended for making floorboards. The invention is particularly suited for use in floating floors such as laminate flooring as well as floorboards with a surface layer of veneer or wood, but is also usable in other similar floorings.

More specifically, the invention relates above all to floors of the type having a core and a decorative surface layer on the upper side of the core.

The present invention is particularly suitable for use in floating floors, which are formed of floorboards which are made up of surface layers of decorative laminate, veneer or decorative plastic material, an intermediate core of woodfiber-based material and preferably a lower balancing layer on the rear side of the core. The following description of known techniques, problems of known systems and objects and features of the invention will therefore, as non-restrictive examples, be aimed above all at this field of application and in particular laminate flooring formed as rectangular floorboards intended to be mechanically joined on both long sides and short sides. However, it should be emphasized that the invention can be used in optional floorboards having a core and a decorative layer arranged on the core.

2. Background of the Invention

Laminate flooring usually consists of a core of a 78 mm fiberboard, a 0.20.8 mm thick upper decorative surface layer of laminate and a 0.10.6 mm thick lower balancing layer of laminate, plastic, paper, or like material. The surface layer provides appearance and durability to the floorboards. The core provides stability and helps, together with the surface layer, to give the floorboard the requisite impact strength. The balancing layer keeps the board plane when the relative humidity (RH) varies during the year. The floorboards are laid floating, i.e., without gluing, on the subfloor. Traditional hard floorboards in floating flooring of this type are usually joined by means of glued tongue-and-groove joints (i.e., joints involving a tongue on one floorboard and a tongue groove on an adjoining floorboard) on the long sides and the short sides.

In addition to such traditional floors, which are joined by means of glued tongue-and-groove joints, floorboards have recently been developed which do not require the use of glue and instead are joined mechanically by means of so-called mechanical locking systems. These mechanical locking systems lock the boards horizontally and vertically. The mechanical locking systems are usually formed by machining the core of the board. Alternatively, parts of the locking system can be formed of a separate material, such as aluminum, which is integrated with the floorboard, i.e., joined with the floorboard even in connection with the manufacture thereof.

The main advantages of floating floors with mechanical locking systems are that they can easily and quickly be laid by various combinations of inward angling and snapping-in. They can also easily be taken up again and used once more at a different location. A further advantage of the mechanical locking systems is that the edge portions of the floorboards can be made of materials which need not have good gluing properties.

Laminate flooring and also many other floorings with a surface layer of plastic, wood, veneer, cork and the like are made by the surface layer and the balancing layer being applied to a core material.

The first generation laminate flooring, so-called HPL flooring, was made by providing a 6 mm thick particle board with a 0.8 mm surface layer of decorative high pressure laminate, usually referred to as HPL. HPL is made in a separate operation where a plurality of impregnated sheets of paper are compressed under high pressure and at a high temperature to a laminate board.

Later the second generation laminate flooring was developed, which is based on a more modern principle where both manufacture of the decorative laminate layer and the fastening to the fiberboard take place in one and the same manufacturing step. Impregnated sheets of paper are applied directly to the board and pressed together under pressure and heat without any gluing. The surface layer is about 0.2 mm thick. This direct laminated flooring, usually referred to as DL flooring, whose main advantage is that the production cost is lower, was first inferior to HPL flooring owing to, for example, a lower degree of impact strength and lower moisture resistance. The quality properties of the DL flooring, however, were significantly improved when the particle board was replaced by a qualified HDF (High Density Fiberboard) type fiberboard-high density fiberboard. The HDF board was considerably harder than the particle board and more resistant to moisture. Thus, the impact strength and moisture resistance of the DL flooring could be improved. As this HDF board was also being manufactured in increasingly larger volumes, the cost was reduced and DL flooring with an HDF core gained increased market share. Although the particle board is considerably cheaper than HDF, the DL technology combined with HDF is altogether less expensive. DL flooring now had quality properties equivalent to those of HPL flooring, but was at the same time essentially less expensive. At this time when DL flooring was being sold in larger quantities than HPL flooring, the laminate flooring was joined using a locking system consisting of tongue, groove and glue. HPL flooring with a core of particle board was easier to glue than DL flooring with a core of HDF. When the mechanical joint systems were developed, also this problem was eliminated, and in a short time DL flooring with a core of HDF captured a large portion of the market.

In addition to the above two methods, a number of other methods are used to manufacture floating floors and provide different core materials with a surface layer. A decorative pattern can be printed on the surface of the core, which is then, for example, coated with a wear layer. The core can also be provided with a surface layer of wood, veneer, decorative paper or plastic sheeting, and these materials can then be coated with a wear layer.

The above methods can result in a floor element in the form of a large board which is then sawn into, for instance, some ten floor panels, which are then machined to floorboards.

The above floor panels are individually machined along their edges to floorboards. The machining of the edges is carried out in advanced milling machines where the floor panel is exactly positioned between one or more chains and bands mounted, so that the floor panel can be moved at high speed and with great accuracy past a number of milling motors, which are provided with diamond cutting tools or metal cutting tools, which machine the edge of the floor panel. By using several milling motors operating at different angles, advanced joint geometries can be formed at speeds exceeding 100 m/min and with an accuracy of ±0.02 mm.

Definition of Some Terms

In the following text, the top visible surface of the installed floorboard is called "front side", while the opposite side of the floorboard, facing the subfloor, is called "rear side". The sheet-shaped starting material that is used is called "core". When the core is coated with a surface layer closest to the front side and preferably also a balancing layer closest to the rear side, it forms a semimanufacture which is called a "floor element". In the case where the "floor element" in a subsequent operation is divided into a plurality of panels, each of the panels are called a "floor panel". When the floor panels are machined along their edges so as to obtain their final shape with the locking system, they are called "floorboards". By "surface layer" are meant all layers applied to the core closest to the front side and covering preferably the entire front side of the floorboard. By "decorative surface layer" is meant a layer which is mainly intended to give the floor its decorative appearance. "Wear layer" relates to a layer which is mainly adapted to improve the durability of the front side. In laminate flooring, this layer includes a transparent sheet of paper with an admixture of aluminum oxide which is impregnated with melamine resin. By "reinforcement layer" is meant a layer which is mainly intended to improve the capability of the surface layer of resisting impact and pressure and, in some cases, compensating for the irregularities of the core so that these will not be visible at the surface. In high pressure laminates, this reinforcement layer usually includes brown kraft paper which is impregnated with phenol resin. By "horizontal plane" is meant a plane which extends parallel with the outer part of the surface layer. Immediately juxtaposed upper parts of two neighboring joint edges of two joined floorboards together define a "vertical plane" perpendicular to the horizontal plane.

The outer parts of the floorboard at the edge of the floorboard between the front side and the rear side are called "joint edge". As a rule, the joint edge has several "joint surfaces" which can be vertical, horizontal, angled, rounded, beveled etc. These joint surfaces exist on different materials, for instance laminate, fiberboard, wood, plastic, metal (especially aluminum) or sealing material. By "joint edge portion" are meant the top joint edge of the floorboard and part of the floorboard portions closest to the joint edge.

By "joint" or "joint system" are meant coacting connecting means which connect the floorboards vertically and/or horizontally. By "mechanical joint system" is meant that the joining can take place without glue, horizontally parallel to the surface and vertically perpendicular to the surface. Mechanical locking systems can in many cases also be joined by means of glue. By "floating floor" is meant a floor with floorboards which are only joined along their respective joint edges and thus not glued to the subfloor. In connection with movement due to moisture, the joint remains sealed. Movement due to moisture takes place in the outer areas of the floor along the walls concealed under the base boards. By "HDF" are meant board materials that are referred to on the market as high-density fiberboard. HDF consists of ground wood fibers joined by means of a binder.

The above techniques can be used to manufacture laminate floorings which are highly natural copies of wooden flooring, stones, tiles, and the like, and which are very easy to install using mechanical joint systems. The length and width of the floorboards are about 1.2*0.2 m and the thickness is about 7-8 mm.

Recently also laminate flooring with other formats and other thicknesses have been introduced on the market. Formats having a length of 1.2 m, a width of 0.4 m and a thickness of about 11 mm are used, for instance, to imitate stones and tiles. Such floorboards will be heavy and difficult to handle in connection with transport and installation since HDF has a density of about 900 kg/m$^3$. Besides the cost of material for an 11 mm HDF core is high. There is thus a need to lower the cost and also the weight of the core in a thick laminate flooring, but also in laminate flooring of normal thickness. The same applies to similar flooring having other surface layers such as veneer, plastic, etc. For parquet flooring, the cost of the surface layers is considerable. The market for floating floors could increase significantly if the cost of the floorboard could be lowered and if the weight could be reduced. Laminate flooring has a hard surface layer which produces a high sound level in the room as people walk on the floor, wearing shoes. This is a disadvantage that reduces the possibility of using the floor, especially in public surroundings.

Conventional Techniques and Problems Thereof

The following facilitates the understanding and description of the present invention as well as the knowledge of the problems behind the invention, with reference to FIGS. 1-3 in the accompanying drawings.

FIGS. 2a-2c show manufacture of an HPL flooring. A wear layer 34 of a transparent material with great wearing strength is impregnated with melamine with aluminum oxide added. A decorative layer 35 of paper impregnated with melamine is placed under this layer 34. One or more reinforcing layers 36a, 36b of core paper impregnated with phenol are placed under the decorative layer 35 and the entire packet is placed in a press where it cures under pressure and heat to about 0.5-0.8 mm thick surface layer 31 of high pressure laminate. FIG. 2c shows how this surface layer 31 can then be glued together with a balancing layer 32 to a core 30 to constitute a floor element 3.

FIGS. 2d and 2e illustrate manufacture of a DL flooring. A wear layer 34 in the form of an overlay and a decorative layer 35 of decoration paper is placed directly on a core 30. All three parts and, optionally, also a rear balancing layer 32 are then placed in the press where they cure under heat and pressure to a floor element 3 with a decorative surface layer 31 having a thickness of about 0.2 mm. Direct laminate has usually no reinforcing layer. The capability of the laminate edge to resist impact and moisture is quite dependent on the properties of the core material. Therefore, use is made of a high quality material with high density and moisture resistance such as HDF. The cost of material for HDF is significantly higher than that for particle board.

FIG. 3a shows an example of a conventional laminate or veneer flooring with a surface layer 31 of, for instance, direct laminate (DL) or 0.6 mm veneer, a core 30 of HDF and a balancing layer 32 of laminate or veneer that are joined by tongue, glue and joint. FIG. 3b shows an example of a laminate flooring with a surface 31 of HPL, a core of HDF and a mechanical locking system which consists of a strip 6 and a locking element 8 of aluminum and which coacts with a locking groove 14 formed in the core 30.

FIG. 3c shows an example of a laminate flooring with a surface 31 of DL, a core 30 of HDF and a mechanical locking system 6, 8, 14, which has been formed from the core 30 of the floorboard. A core of HDF can, in this case, assist the locking system to obtain the required strength and function.

FIG. 3d shows an example of a laminate flooring with a surface 31 of DL, a core of HDF and a mechanical joint system with a locking element 8 and a locking groove 14 in the upper part of the tongue groove.

FIG. 3e shows a parquet flooring, seen from the long side, with a thickness of about 15 mm, which has a surface layer 31 of, e.g., 3 mm oak. The core consists in this example of different kinds of wood. A harder kind of wood 30a, 30b is to be found at the joint edge portions forming the mechanical locking system 7, 7'. Between these joint edge portions, the core 30 consists of wood slats 30c made of a soft and inexpensive kind of wood. The slats 30c are joined with the surface layer 31 and the balancing layer 32 by gluing. They often can contain knots, cracks and the like. The surface layer has a sufficient thickness to bridge these irregularities as well as the joints 37 between the slats 30c of the core. These floorboards suffer from a number of problems, which are, above all, related to cost and function.

The HDF core gives a laminate flooring or veneer flooring sufficient impact resistance in the surface and at the joint edges has the same high quality in the entire floorboard. This high quality is not necessary, for instance, in the inner and rear parts of the floorboard.

Penetration of moisture into a floorboard takes place, for example, in the upper portions of the joint edge closest to the surface and it is in these portions that the HDF material is useful. In the other portions of the floorboard, lower quality properties would be sufficient.

To form a mechanical locking system with projecting parts, the joint edge and also the core of the floorboard are of good quality. Also in this context, the high quality is only necessary in certain parts of the joint edges.

A parquet flooring has a wear layer of about 3 mm. This provides the surface sufficient impact strength and bridges the spaces between the wood slats of the core so as to prevent them from telegraphing through the surface layer and becoming visible in the surface. The surface layer is protected by a strong varnish and regrinding takes place only rarely or not at all. Consequently, the thickness of the wear layer could be reduced if the remaining problems could be solved.

The above problems result in a high cost of material and a high weight. The hard surface produces an undesirable sound level.

To counteract these problems, different methods have been employed. One method is to reduce quality and density of the HDF board. DL flooring is also made with a particle board as core material. These methods result in a lower cost and a lower weight, but at the same time the impact strength is insufficient, the boards are sensitive to moisture, and the mechanical joint systems have low strength and a poor function.

Parquet flooring is made with a core of particle board, HDF or plywood. These materials are typically more expensive than a core of slats. A core of slats also reduces the board's movement due to moisture better than other board materials, since the slats of the core are placed perpendicular to the longitudinal direction of the board. This means that the fiber direction of the slats is perpendicular to the fiber direction of the surface layer. Such a fiber orientation is favorable to counteract movement caused by moisture.

To reduce the sound level, laminate flooring can be installed on a sound-absorbing layer of plastic, rag paper, textile fiber, and the like. These layers have also been glued to the balancing layer of the rear side. This form of sound absorption yields a poor result and the cost is high.

OBJECTS AND SUMMARY

An object of the present invention is to eliminate or significantly reduce one or more of the problems occurring in connection with manufacture of floating floorboards and in particular such floorboards with mechanical joint systems.

According to one embodiment of the invention, the core is made of different layers consisting of different materials or of the same material but with different properties. This allows the cost of material to be reduced while at the same time the other properties of the floorboard, such as impact strength and moisture resistance, can be unchanged.

According to another embodiment of the invention a core material different layers can provide a lower weight without impairing the other quality properties.

According to a further embodiment of the invention, a core material comprising with different layers can produce better sound properties.

According to still another embodiment of the invention, a core material comprising different layers allows manufacture of floorboards with mechanical locking systems having a high quality while at the same time the cost can be reduced.

The embodiments, either alone or in combination, are particularly suited for use in floating floors including floorboards whose core contains wood fibers, such as wood slats, particle board, MDF, HDF, compact laminate, plywood, and the like. Such board materials can easily be glued to each other in different layers and they may, for instance, by impregnated with suitable chemicals, be given improved properties, for instance regarding density, impact strength, flexibility, moisture resistance, friction, and the like. In this way, optimal board materials can be manufactured and combined as regards function and cost level of the floorboard and the joint system. Wood-fiber-based materials can be formed to advanced geometries by cutting. The core may also comprise different plastic materials, rubber materials, and the like, which can also be combined with different wood-fiber-based materials. All the core materials described above can be used to form floorboards having different types of known mechanical locking systems.

Thus, a large number of combinations of different floorboards, locking systems, materials and formats can be provided.

According to a first aspect of the invention, floorboards are thus provided to form floating laminate flooring, which floorboards have a core and a surface layer arranged on the upper side of the core. The core has at least two layers of material arranged at different distances from the surface layer, and the two layers differ from each other with respect to at least one of the parameters of 1) a composition of the material and 2) a material property.

According to a second aspect of the invention, semimanufactures for floating laminate flooring are provided, which have a core and a surface layer arranged on the upper side of the core as well as a balancing layer arranged on the lower side of the core. The core of the semimanufacture has at least two layers of material arranged at different distances from the surface layer, and the two layers differ from each other with respect to at least one of the parameters of 1) a composition of the material and 2) a material property. The layer of material closest to the surface layer may, in a preferred embodiment, include HDF and the layer of material at a distance from the surface layer may include particle board.

According to a third aspect of the invention, floorboards for forming floating veneer flooring are provided. The floorboards have a core and a surface layer arranged on the upper side of the core and have a thickness of, for instance, 0.6-1.5 mm and a balancing layer arranged on the lower side of the core. The core has at least two layers of material arranged at different distances from the surface layer, and the two layers differ from each other with respect to at least one of the parameters of 1) a composition of the material and 2) a material property. The layer of material closest to the surface layer may include HDF and the layer of material at a distance from the surface layer may include particle board.

According to a fourth aspect of the invention, floorboards for forming floating wooden flooring are provided. The floorboards have a core and a surface layer of wood arranged on the upper side of the core and a balancing layer of wood arranged on the lower side of the core. The core has at least two layers of material arranged at different distances from the surface layer. The layer of material closest to the surface layer includes HDF and the layer of material closest to the balancing layer includes wood.

DETAILED DESCRIPTION OF PREFERRED EMBODIMENTS

Figure 1A:
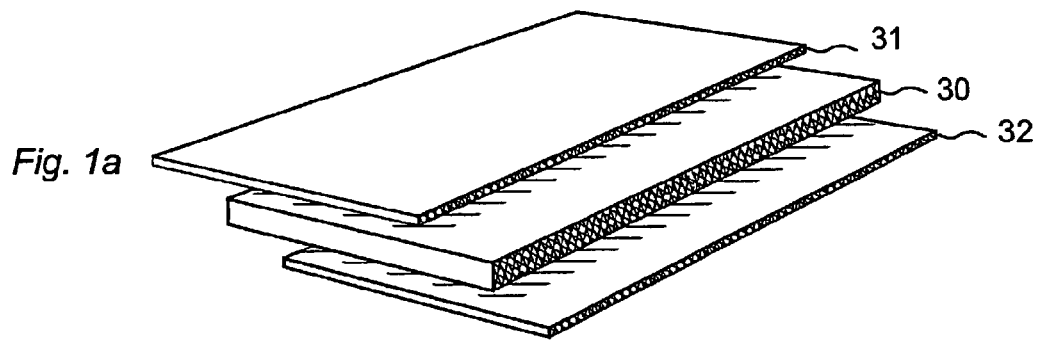
FIGS. 1a-d illustrate conventional steps of manufacture of a floorboard.
Figure 1B:
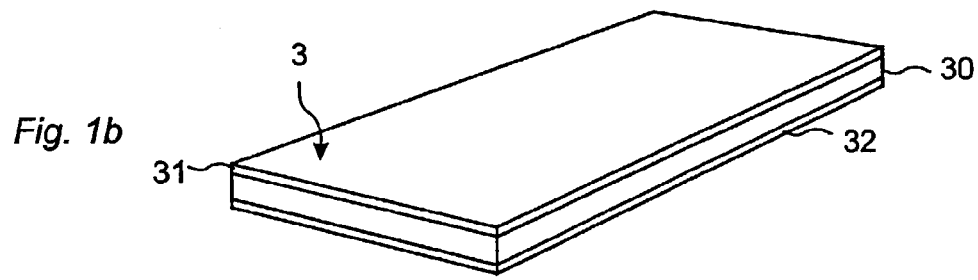
Figure 1C:
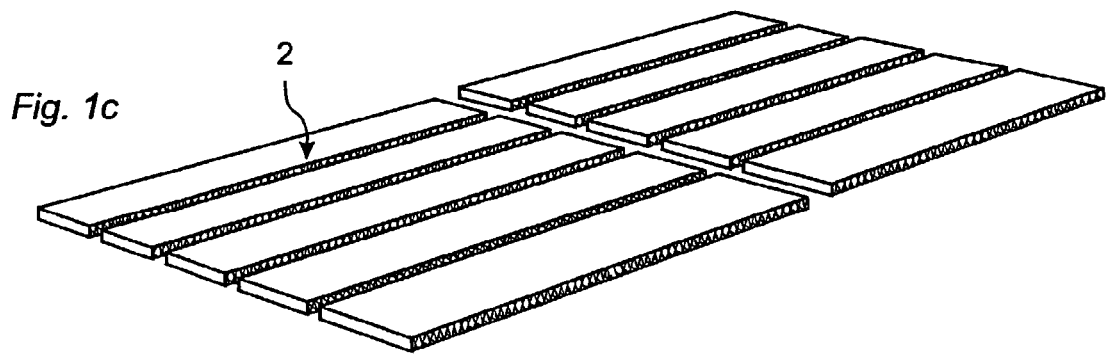
Figure 1D:
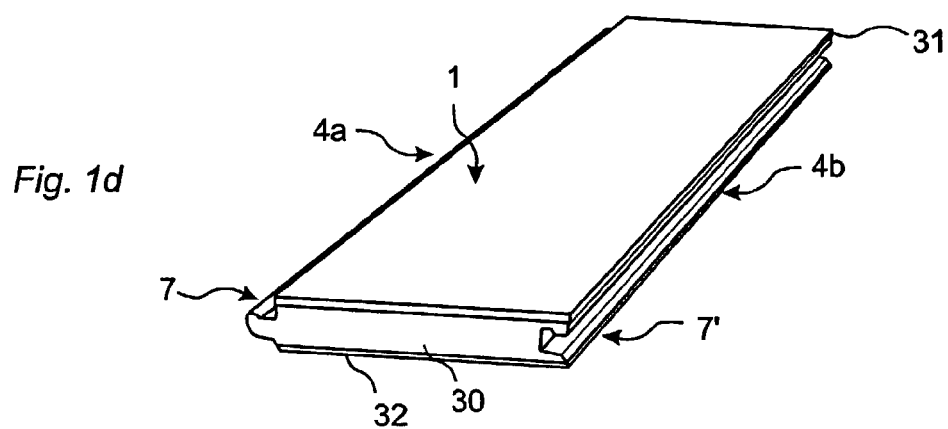
Figure 2A:
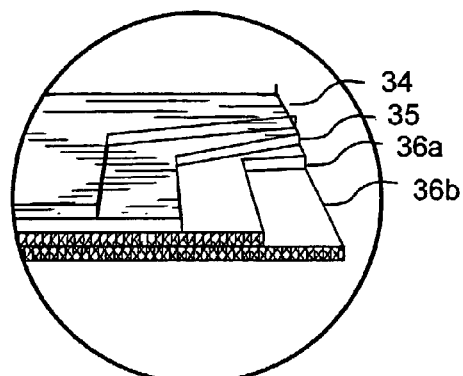
FIGS. 2a-e illustrate the composition of known laminate flooring with a surface of high pressure laminate and direct laminate.
Figure 2B:
Figure 2C:
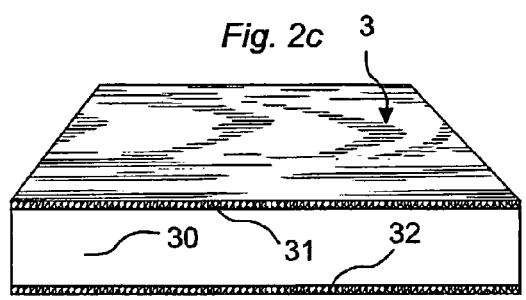
Figure 2D:
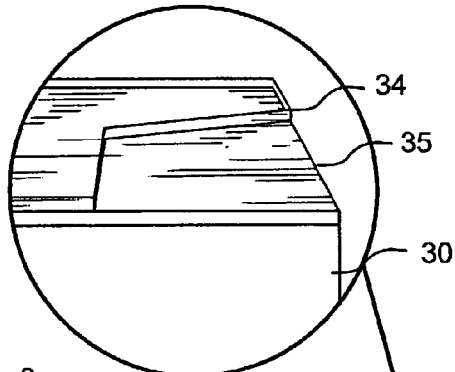
Figure 2E:
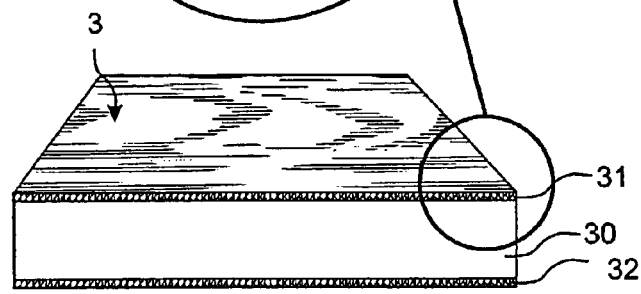
Figure 3A:
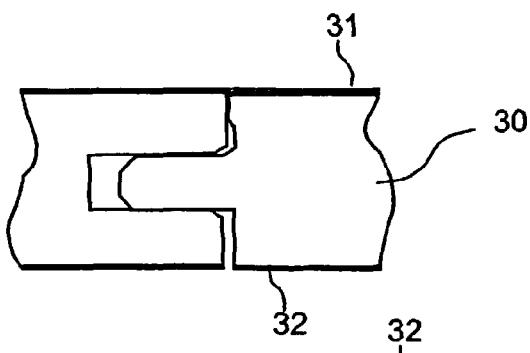
FIGS. 3a-e illustrate examples of conventional floorboards.
Figure 3B:
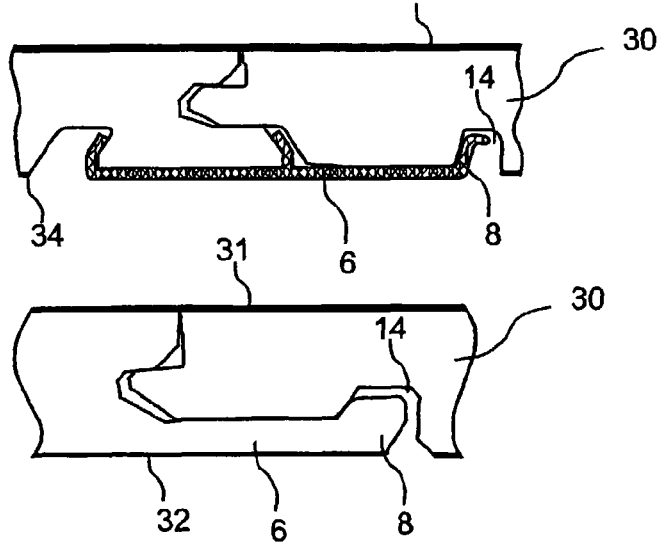
Figure 3C:
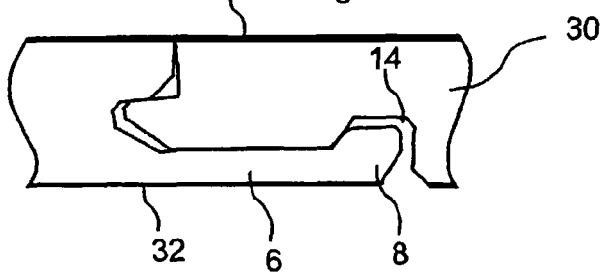
Figure 3D:
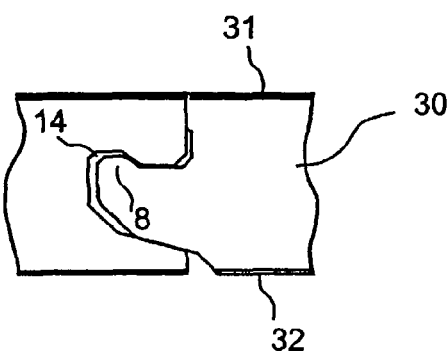
Figure 3E:
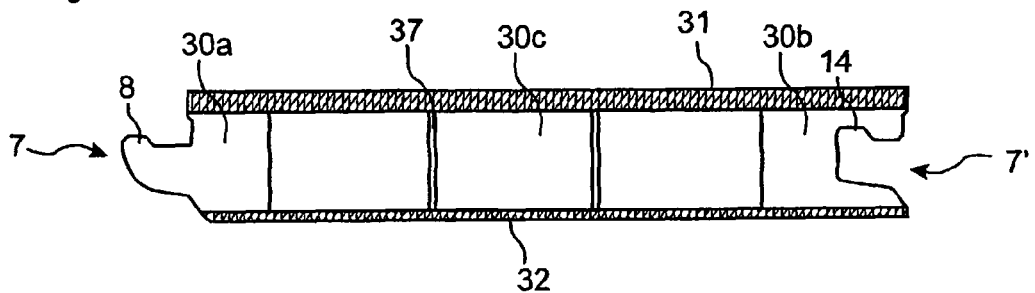
Figure 4:
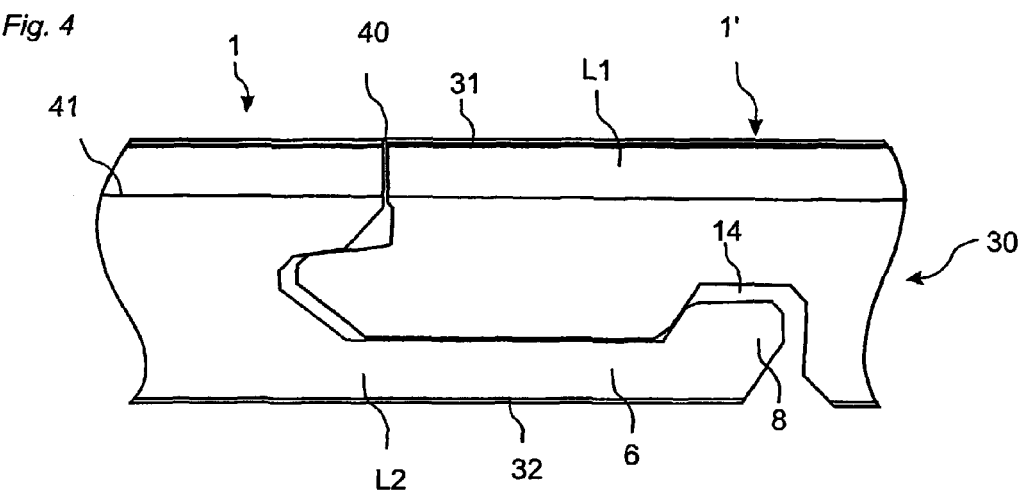
FIG. 4 illustrates a floorboard according to an embodiment of the invention.

FIG. 4 illustrates a preferred embodiment of the invention. The floorboard 1 can be, for instance, a laminate or veneer floor. The thickness can be, for instance, 612 mm. In the embodiment illustrated, the floorboard 1 has a surface layer 31 of direct laminate DL, a balancing layer 32 of DL and a core 30 which consists of two layers L1 and L2. The upper layer L1 closest to the surface can, for instance, be made of HDF having high density and moisture resistance. The lower layer L2 can, for instance, be made of a lower quality of HDF, of MDF, or of other wood-fiber-based materials. A preferred alternative is particle board. The two layers of material are preferably joined by gluing. In this embodiment there is thus a glue layer 41 between L1 and L2. Such a floor will have good properties in the upper parts closest to the surface. Upper joint edges 40 will have high impact strength, and moisture penetrating between the joint edges will not cause much problems. The lower layer L2 of the core may include, for instance, a less expensive material, such as particle board of low density. In this manner, the floorboard will have good properties while at the same time it can be manufactured at a low cost. The weight will also be lower. By making the core of two materials L1 and L2, the savings in cost that are made in the lower layer can be used to increase the quality of the upper layer. The floorboards 1, 1' can also be made thicker and more stable with unchanged weight and cost. The sound level can be reduced by the floorboard having a different sound frequency which is felt to be more pleasant. The sound level can also be reduced by choosing suitable materials in the core.

According to an embodiment the invention, floor elements can be made by, for instance, board materials of HDF and particle board being glued to a core comprising of two or more layers of material, such as L1 and L2. The HDF board is ground in the normal manufacture so as to obtain an even surface and uniform thickness. Such grinding may wholly or partly take place after gluing of the layers of material. In this way, a saving in material can take place by a smaller amount of material or less expensive material being removed by grinding. After gluing of the core, lamination or gluing of the surface layer takes place. If the layers of material of the core have the correct thickness even before gluing, gluing of the layers of material L1, L2 of the core as well as the surface layer 3 and the balancing layer 32 can take place in one and the same operation. It is also possible to combine direct laminating with gluing of the layers of material of the core by gluing taking place using methods that allow complete or partial activation of layers of glue using the pressure and heat that arise in connection with direct laminating.

Figure 5:
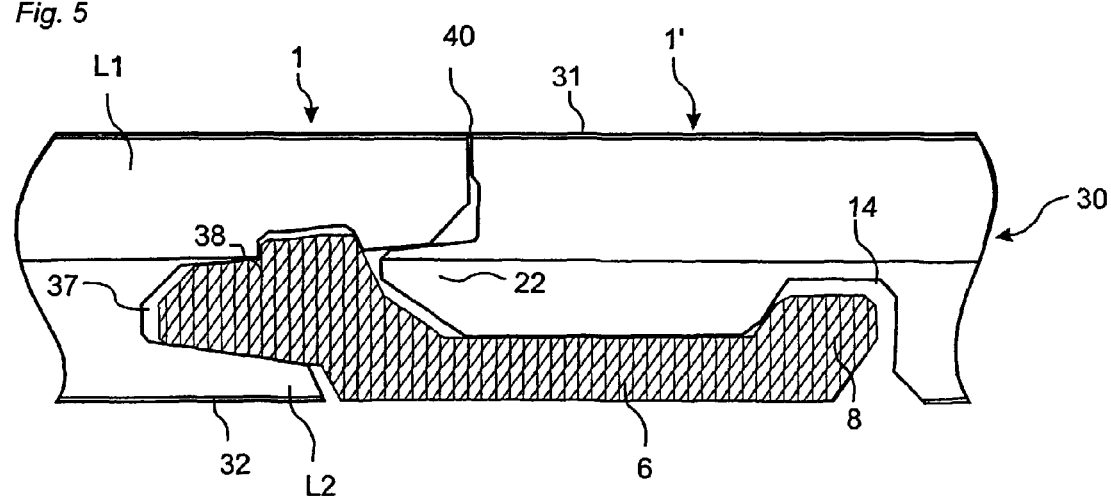
FIG. 5 illustrates an alternative embodiment of a floorboard according to an embodiment of the invention.
Figure 7:
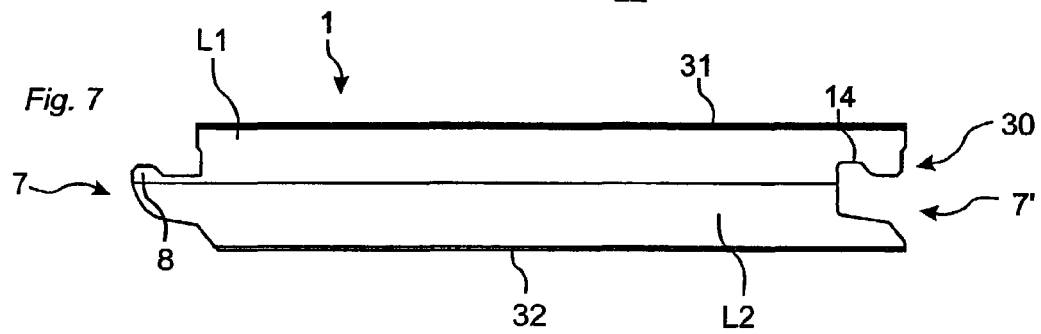
FIG. 7 illustrates a different embodiment of the invention.

The upper layer of material L1 can be used in the mechanical joint system as, for example, illustrated in FIGS. 5 and 7. In FIG. 5, a separately machined strip 6 of, for instance, HDF material has been joined with the core by snapping-in of the strip tongue 38 into the strip groove 37. This joining can take place in softer materials such as particle board, but the strength may be higher if the mechanical joining takes place with, for instance, HDF material. The strip tongue 38 has in the upper part locking elements and positioning surfaces which lock the strip 6 horizontally and vertically to the floorboard 1. As an alternative, the strip 6 can also be constructed so as to allow fastening by the strip tongue 38 being angled into the strip groove 37 by an angular motion either from above or from below, but this may result in a more complicated fastening method than snapping-in. The strength of the mechanical locking system may be lower. In the embodiment illustrated in FIG. 5, the tongue 22 of the second floorboard 1' is positioned vertically between two HDF materials, which facilitates lateral displacement in the locked position. This is preferred for quadrilateral mechanical locking of floorboards.

Figure 6:
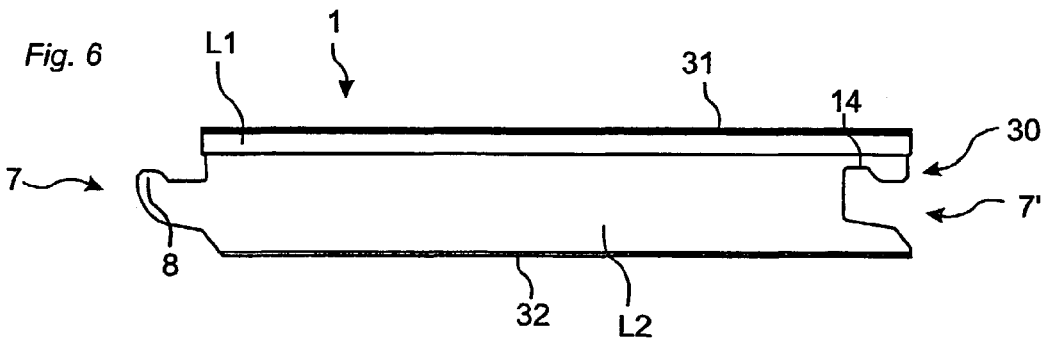
FIG. 6 illustrates a different embodiment of the invention.

FIG. 6 shows an example of an embodiment of a floorboard which has a relatively thin layer of a hard and moisture-proof material L1 closest to the surface layer 31.

FIG. 7 shows an example of an embodiment of a board 1 with a core 30 having two materials L1 and L2 of similar thickness. The upper layer of material L1 has been selected so that the locking system 7, 7' and its locking elements 8, 14 are made of this material.

Figure 8:
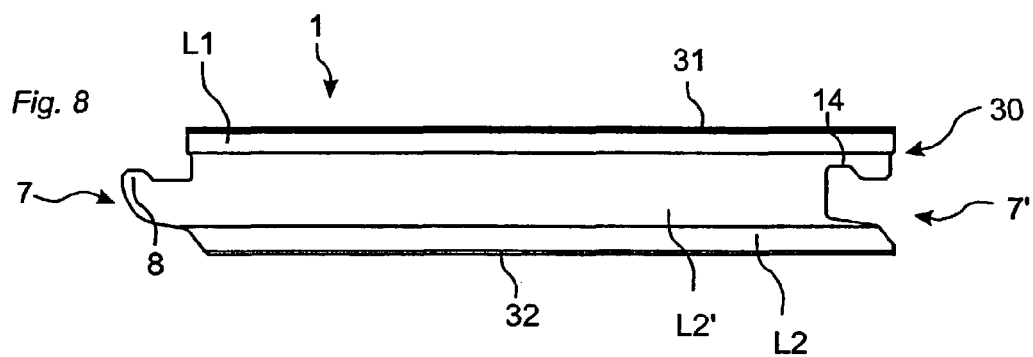
FIG. 8 illustrates a different embodiment of the invention.

FIG. 8 shows an embodiment of a core 30 comprising three layers of material L1, L2 and L2'. The layer of material L1 closest to the surface 31 and the lower layer of material L2 closest to the balancing layer 32 can preferably be identical. This may facilitate balancing of the board so that it keeps plane as relative humidity varies. A mechanical locking system with a strip in the lower part according to FIG. 4 can be made of this material L2. Moreover, the upper and lower layers of material L1, L2 may be adjusted so as to facilitate laminating or gluing of surface layer and balancing layer. In this manner, the material L2' may be selected in the center layer of the core, which need not be capable of laminating or easy to glue in a normal gluing process.

Figure 9:
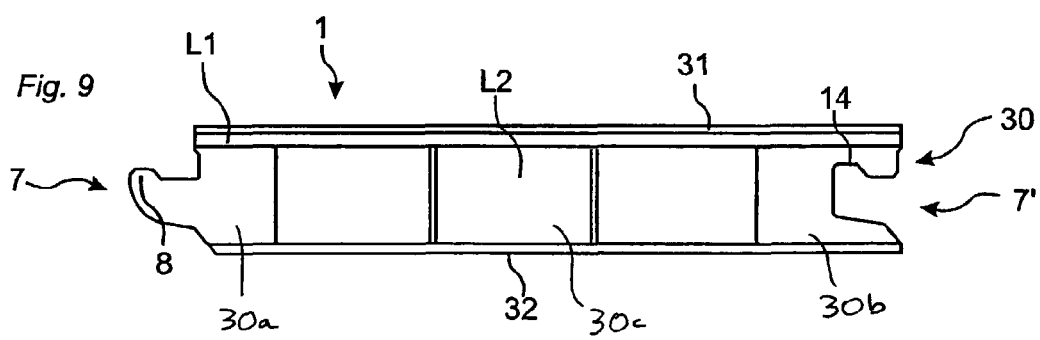
FIG. 9 illustrates a different embodiment of the invention.

FIG. 9 shows an embodiment of the invention in which a floorboard 1 is a parquet floor. The surface layer 31 of the floorboard 1 includes a wood layer which is thinner than the conventional wood layers. These conventional wood layers are about 2-3 mm. According to this embodiment of the invention, the surface layer 31, which includes hard and expensive high-grade wood, can be made with a reduced thickness, for instance about 1 mm. This thickness is sufficient to allow regrinding. The varnish systems can be selected so that regrinding is at least minimized if not unnecessary. The remaining part of the wood layer 31, which can bridge the irregularities of the core of slats, can be provided with a considerably less expensive and better suited material L1, for instance HDF. The surface layer 31 of high-grade wood has thus, according to the embodiment of the invention, been replaced by a thin layer of wood and a high quality but less expensive material, such as HDF. HDF with high density can replace high-grade wood in parquet flooring with a body of slats. Such a surface layer, which thus includes a thin layer of high-grade wood and an advanced board material, can be manufactured so that, compared with conventional surface layers of high-grade wood, the surface layer has improved bridging of irregularities of the core of slats, is more stable and reduces movements caused by moisture in case of variations in relative humidity. This can be achieved in combination with a lower cost of material.

Several variations are feasible within the scope of the invention. The number of layers of material in the core can be more than three. The thickness of the different layers may vary. Special HDF materials can be manufactured using a significantly larger amount of binder and with an increased density exceeding 1200 kg/m$^3$. Particle boards with special binders and particle sizes can be manufactured so that they are optimally adjusted to interact with HDF in wood or laminate flooring. Basically, all wood-based board materials can be used that are normally to be found in the building and furniture industry. The invention is not limited to thin floors. According to the principles of the invention, laminate flooring can be manufactured in thicknesses exceeding 12 mm, for instance 14-15 mm, and with a competitive cost structure and weight. Such thick laminate flooring has a more pleasant sound level and may bridge great irregularities in the subfloor. The invention can also be used for floorboards without a balancing layer and on floorboards which are not laid floating, but which are glued to the subfloor.

And, in the FIG. 9 embodiment, the end slats 30a and 30b can be made from a harder kind of wood than the slats 30b.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A plurality of floorboards for making a floating laminate flooring, each of said floorboards comprising:
   a core; and
   a surface layer arranged on an upper side of the core,
   wherein the core includes at least two layers,
   a first of the core layers is closest to the surface layer and comprises HDF, and
   a second of the core layers is next to the first layer and comprises a wood or wood-based material of lower density than said first core layer.

2. The plurality of floorboards as claimed in claim 1, wherein the core includes a balancing layer.

3. The plurality of floorboards as claimed in claim 1, wherein the second layer comprises HDF, MDF or a particle board material.

4. The plurality of floorboards as claimed in claim 1, wherein each floorboard includes a connector for connecting a second floorboard with a previously installed first floorboard by at least one of inward angling and snapping-in to a locked position.

5. The plurality of floorboards as claimed in claim 1, wherein the surface layer comprises a thermosetting resin.

6. The plurality of floorboards as claimed in claim 1, wherein the second core layer comprises a wood fiber board material.

7. The plurality of floorboards as claimed in claim 1, wherein the surface layer is a direct laminate.

8. The plurality of floorboards as claimed in claim 1, wherein the second core layer is glued to the first core layer.

9. A semimanufacture for manufacturing a plurality of floorboards for a floating laminate flooring, said semimanufacture comprising:
   a core;
   a surface layer arranged on an upper side of the core; and
   a balancing layer arranged on a lower side of the core,
   wherein the core includes at least two layers,
   a first of the core layers is closest to the surface layer and comprises HDF, and
   a second of the core layers is next to the first layer and comprises a wood or wood-based material of lower density than said first core layer.

10. The semimanufacture as claimed in claim 9, wherein the second layer comprises HDF, MDF or a particle board material.

11. The semimanufacture as claimed in claim 9, wherein the surface layer comprises a thermosetting resin.

12. The plurality of floorboards as claimed in claim 9, wherein the second core layer comprises a wood fiber board material.

13. The semimanufacture as claimed in claim 9, wherein the second core layer is glued to the first core layer.

14. A plurality of floorboards for making a floating veneer flooring, each of said floorboards comprising:
   a core;
   a surface layer arranged on an upper side of the core; and
   a balancing layer arranged on a lower side of the core,
   wherein the core includes at least two layers,
   a first of the core layers is closest to the surface layer and comprises HDF, and
   a second of the core layers is next to the first layer and comprises a wood or wood-based material of lower density than said first core layer.

15. The plurality of floorboards as claimed in claim 14, wherein the surface layer comprises a thermosetting resin.

16. The plurality of floorboards as claimed in claim 14, wherein the second core layer comprises HDF, MDF or a particle board material.

17. The plurality of floorboards as claimed in claim 14, wherein the second core layer is glued to the first core layer.

18. A plurality of floorboards for making a floating wooden flooring, each of said floorboards comprising:
   a core;
   a surface layer of wood arranged on an upper side of the core; and
   a balancing layer of wood arranged on a lower side of the core,
   wherein the core includes at least two layers,
   a first of the core layers is closest to the surface layer and comprises HDF, and
   a second of the core layers is next to the first layer and comprises a wood or wood-based material of lower density than said first core layer.

19. The plurality of floorboards as claimed in claim 18, wherein the surface layer comprises a thermosetting resin.

20. The plurality of floorboards as claimed in claim 18, wherein the second core layer comprises a wood fiber board material.

21. The plurality of floorboards as claimed in claim 18, wherein the second core layer comprises HDF, MDF or a particle board material.

22. The plurality of floorboards as claimed in claim 18, wherein the second core layer is glued to the first core layer.

* * * * *